United States Patent [19]

Mayer-Schwinning et al.

[11] Patent Number: 4,935,113
[45] Date of Patent: Jun. 19, 1990

[54] PROCESS OF PURIFYING THE AQUEOUS EFFLUENT FROM PAINT, LACQUER AND VARNISH SPRAY BOOTHS

[75] Inventors: Gernot Mayer-Schwinning, Bad Homburg; Günter Böning, Frankfurt, both of Fed. Rep. of Germany

[73] Assignee: Metallgesellschaft Aktinegesellschaft, Frankfurt, Fed. Rep. of Germany

[21] Appl. No.: 276,685

[22] Filed: Nov. 28, 1988

[30] Foreign Application Priority Data

Dec. 1, 1987 [DE] Fed. Rep. of Germany ....... 3740663

[51] Int. Cl.$^5$ ............................. B03C 5/00; C02F 1/00
[52] U.S. Cl. ..................................... 204/149; 204/164
[58] Field of Search ........................ 204/149, 164, 149; 55/7, 8, 6

[56] References Cited

U.S. PATENT DOCUMENTS 3,729,898  5/1973  Richardson ................................. 55/7
3,856,476  12/1974  Seversky ................................. 23/284

FOREIGN PATENT DOCUMENTS 3705634  9/1988  Fed. Rep. of Germany .

Primary Examiner—John F. Niebling
Assistant Examiner—Arun S. Phasge
Attorney, Agent, or Firm—Felfe & Lynch

[57] ABSTRACT

Disclosed is a process for purifying an aqueous effluent which is formed by the scrubbing with water of the exhaust air from paint, lacquer and varnish spray booths. In the process the aqueous effluent is sprayed at a temperature between 10 and 80° C. vertically from top to bottom into an electric field, which is established between a corona electrode and a collecting electrode and has a voltage between 10,000 and 80,000 volts, a field strength between 0.5 and 10 kV/cm and contains air as a dielectric. The aqueous effluent drained from the collecting electrode is received by a separator, in which the particles of coloring matter and any solvent are separated from the water by density separation.

8 Claims, No Drawings

PROCESS OF PURIFYING THE AQUEOUS EFFLUENT FROM PAINT, LACQUER AND VARNISH SPRAY BOOTHS

BACKGROUND OF THE INVENTION

The present invention is in a process of purifying an aqueous effluent which results from a scrubbing of the exhaust air from a paint, lacquer or varnish spray booth.

In a paint, lacquer or varnish spray booth, as much as 50% of the paint, lacquer or varnish becomes suspended in the air which is contained in or supplied to the spray booth. As a result, the exhaust air from a spray booth contains solvent droplets and vapors as well as particles of coloring matter. The solvents contained in the exhaust air from the spray booths are separated by an adsorbent and are subsequently recovered by desorption. The particles of coloring matter must be separated from the exhaust air by a scrubbing treatment prior to the solvent adsorption because those particles would deposit on the adsorbent and would interfere with the solvent separation.

It is already known that the exhaust air from paint, lacquer or varnish spray booths can be exhausted and scrubbed with water in a scrubber. The scrubbing water takes up parts of the solvent and the particles of coloring matter, some of which are very sticky, and for this reason must be purified. This purification can be accomplished by a treatment with a flocculating agent, such as bentonite, so that the particles of coloring matter and fractions of the solvent become bonded in the sludge. The sludge is separated by sedimentation or filtration and after a partial dewatering is placed on a dump. The water is returned to the scrubbing cycle.

That known process has particularly the disadvantage that large quantities of sludge must be dumped and the particles of coloring matter separated from the aqueous effluent cannot be returned to the coating process. For instance, in a plant for applying lacquer or varnish in 30 coating trains for coating 12,240 car bodies in 24 hours, 180,000 m$^3$ of aqueous effluent containing 12,200 kg particles of coloring material will become available during that period. Flocculating agent in an amount of 288,000 kg will be required in 24 hours for the separation of the particles of coloring material.

For this reason it is an object of the invention to provide a process for the purification of the aqueous effluent from treatment of the exhaust of paint, lacquer or varnish spray booths, in which sewage sludge that must be dumped will not be formed and which permits recycling of the particles of coloring material contained in the aqueous effluent.

THE INVENTION

The object underlying the invention and others are accomplished in a process wherein the aqueous effluent is sprayed at a temperature between 10° and 80° C. vertically from top to bottom into an electric field, which is established between a corona electrode and a collecting electrode and has a voltage between 10,000 and 80,000 volts and a field strength between 0.5 and 10 kV/cm and contains air as a dielectric. The aqueous effluent is drained from the collecting electrode and introduced into a separator, in which the particles of coloring matter and any solvent are separated from the water by a density separation. It has surprisingly been found that the aqueous suspension of lacquer or varnish which is sprayed into the electric field will be influenced by the electric field strength in such a manner that the particles of coloring material will be detackified and can be separated by density separation.

European Patent Specification No. 0 047 432 discloses a multistage process of purifying the exhaust air in a paint, lacquer or varnish spray plant, in which a part of the lacquer or varnish particles are removed from the exhaust air by means of a moist purifying apparatus and the exhaust air is subsequently filtered in a further purifying stage, whereafter at least part of the filtered exhaust air is supplied to a spray booth, and part of the lacquer or varnish particles are initially removed from the exhaust air in a scrubber and the humidity of the exhaust air is sufficiently increased to substantially saturate the exhaust air with water vapor, whereafter the exhaust air is passed through a wet-process electrostatic precipitator while the humidity of the exhaust air is maintained, the collecting surfaces of the separator are rinsed with a rinsing liquid so as to remove the deposited lacquer or varnish particles, and the rinsing liquid is treated to remove at least a portion of the lacquer or varnish particles and is subsequently recycled to the electrostatic precipitator. One of ordinary skill in the art could not have expected that the particles of coloring material suspended in the aqueous effluent could be influenced by the action of the electric field in such a manner that they are detackified and can easily be separated from the aqueous suspension, which differs in properties from a gas phase.

German Patent Application No. P 37 05 634.4 discloses a process for purifying exhaust air from paint, lacquer or varnish spray booths. In that process the used scrubbing water is recirculated and the exhaust air from the spray booth is sprayed with scrubbing water without any pretreatment and is immediately supplied thereafter to a wet-process electrostatic precipitator. However, it has been found that the rate of purification in the process proposed in German Patent Application No. P 37 05 634.4 is not satisfactory and cannot be increased by an increase of the scrubbing water rate because flashovers will occur in the electric field if the rate of scrubbing water is excessive. For this reason it was extremely surprising in view of the results achieved by the process in accordance with German Patent Application No. P 37 05 634.4 that a high rate of purification can be achieved if the aqueous effluent which comes from a spray booth and is contaminated with particles of coloring matter and solvents is sprayed into an electric field.

The process in accordance with the invention can be carried out with particularly good results if the aqueous effluent has in the electric field a residence time between 0.1 and 10 seconds, the aqueous effluent is sprayed into the electric field at a rate between 10 and 200 liters of aqueous effluent per m$^2$ collecting electrode surface area and per hour, and the droplets of the aqueous effluent sprayed into the electric field are between 0.02 and 2 mm in diameter.

It is also contemplated within the scope of the invention that the aqueous effluent is sprayed into the electric field through a single-fluid nozzle under a pressure between 2 and 50 bars or that the aqueous effluent is mixed with air and is sprayed into the electric field through a two-fluid nozzle such that the aqueous effluent and the air are under a pressure between 1 and 10 bars and the volume ratio of aqueous effluent to air is between 1:10 and 1:1.

In accordance with a further feature of the invention the aqueous effluent running from the collecting electrode is maintained in the separator for a residence time of between 2 and 120 minutes because the particles of coloring material will float or sink during that time so that they can easily be separated from the water. In many instances, it is desirable to accelerate the separation of the particles of coloring material and of any solvents by flotation. In that mode of operation the particles of coloring material are separated and air is blown into the aqueous effluent which has been treated in the electric field and the particles of coloring material together with portions of any solvent will float very quickly.

The invention will now be explained in more detail with reference to an illustrative embodiment.

Aqueous effluent from a scrubber treating the exhaust air from a lacquering booth, containing 1 to 100 grams (solids) and contaminated with residual solvent, was sprayed at a rate of from 300 to 3000 liters per hour into an electrostatic precipitator, which had an inlet cross-section of 1 m$^2$ and in which a plurality of corona electrodes and platelike collecting electrodes were arranged. The spacing of the gas flow passages was 300 mm and the electric field had an active height of 2.5 meters so that the collecting surface area amounted to about 20 m$^2$. This corresponds to aqueous effluent at a rate of 15 to 150 liters per hour and per m$^2$ of collecting electrode surface area.

The particles of coloring material contained in the effluent were collected at the collecting electrode and were drained into a sedimentation vessel, in which the particles of coloring material floated and could be separated almost entirely from the aqueous effluent. The aqueous effluent which had been purified could be recycled to the exhaust air scrubber. The solvent-contained particles of coloring material were recycled to the plant for producing lacquer. The aqueous effluent which had been purified always contained less than 0.1 gram solids (dry matter) per liter and was odorless and free of solvent.

It will be understood that the specification and examples are illustrative but not limitative of the present invention and that other embodiments within the spirit and scope of the invention will suggest themselves to those skilled in the art.

We claim:

1. A process of purifying an aqueous effluent which is formed by a scrubbing with water of the exhaust air from paint, lacquer or varnish spray booth comprising:
    spraying the aqueous effluent at a temperature between 10° and 80° C. vertically from top to bottom into an electric field, which is established between a corona electrode and a collecting electrode and has a voltage between 10,000 and 80,000 volts, a field strength between 0.5 and 10 kV/cm and contains air as a dielectric;
    draining the aqueous effluent from the collecting electrode;
    passing the drained effluent into a separator; and
    separating the particles of coloring matter and any solvent from the water by a density separation.

2. The process of claim 1 wherein the aqueous effluent has a residence time in the electric field between 0.1 and 10 seconds.

3. The process of claim 1 wherein the aqueous effluent is sprayed into the electric field at a rate between 10 and 200 liters of aqueous effluent per m$^2$ collecting electrode surface area and per hour.

4. The process of claim 1 wherein the aqueous effluent is sprayed as droplets into the electric field and the droplets have a diameter of from 0.02 to 2 mm.

5. The process of claim 1 wherein the aqueous effluent is sprayed into the electric field through a single-fluid nozzle under a pressure between 2 and 50 bars.

6. The process of claim 1 wherein the aqueous effluent is mixed with air and is sprayed into the electric field through a two-fluid nozzle such that the aqueous effluent and the air are under a pressure between 1 and 10 bars and the volume ratio of aqueous effluent to air is between 1:10 and 1:1.

7. The process of claim 1 wherein the aqueous effluent running from the collecting electrode is maintained in the separator for a residence time of from 2 to 120 minutes.

8. The process of claim 1 wherein the separation of the particles of coloring matter and of any solvents is accelerated by a flotation.

* * * * *